(12) United States Patent
Sasaki (10) Patent No.: US 8,993,199 B2
(45) Date of Patent: Mar. 31, 2015

(54) FLEXIBLE CARBON FIBER NONWOVEN FABRIC

(75) Inventor: Naokazu Sasaki, Chiba (JP)

(73) Assignee: Nisshinbo Holdings, Inc., Tokyo (JP)

( * ) Notice: Subject to any disclaimer, the term of this patent is extended or adjusted under 35 U.S.C. 154(b) by 22 days.

(21) Appl. No.: 13/513,798

(22) PCT Filed: Nov. 16, 2010

(86) PCT No.: PCT/JP2010/070334
§ 371 (c)(1), (2), (4) Date: Jun. 4, 2012

(87) PCT Pub. No.: WO2011/070893
PCT Pub. Date: Jun. 16, 2011

(65) Prior Publication Data
US 2012/0251925 A1    Oct. 4, 2012

(30) Foreign Application Priority Data

Dec. 9, 2009    (JP) .................................. 2009-279112

(51) Int. Cl.
| | |
|---|---|
| H01M 4/86 | (2006.01) |
| H01M 8/04 | (2006.01) |
| D01D 5/00 | (2006.01) |
| D01F 1/10 | (2006.01) |
| D01F 9/14 | (2006.01) |

(Continued)

(52) U.S. Cl.
CPC ......... *H01M 8/04216* (2013.01); *D01D 5/0038* (2013.01); *D01F 1/10* (2013.01); *D01F 9/14* (2013.01); *D04H 1/728* (2013.01); *H01M 8/0234* (2013.01); *Y02E 60/50* (2013.01); *B01J 20/20* (2013.01); *B01J 20/28038* (2013.01); *D01F 6/54* (2013.01); *D01F 6/94* (2013.01); *D01F 9/22* (2013.01); *D01F 9/24* (2013.01)
USPC .......................... 429/530; 429/481; 429/484

(58) Field of Classification Search
CPC ............. B01J 20/28038; D04H 1/728; H01M 8/0234; H01M 8/04216
USPC ......................................... 429/481, 484, 530
See application file for complete search history.

(56) References Cited

U.S. PATENT DOCUMENTS

| | | | |
|---|---|---|---|
| 6,183,898 B1 * | 2/2001 | Koschany et al. | ............ 429/481 |
| 8,007,953 B2 | 8/2011 | Tanuma | |

(Continued)

FOREIGN PATENT DOCUMENTS

| | | |
|---|---|---|
| CA | 2 706 624 A1 | 6/2009 |
| JP | 2003-239164 A | 8/2003 |

(Continued)

OTHER PUBLICATIONS

S. Imaizumi et al., "Phenolic Resin-Based Carbon Thin Fibers Prepared by Electrospinning: Additive Effects of Poly (vinyl butyral) and Electrolytes", Polymer Journal, vol. 41, No. 12, 2009, pp. 1124-1128 (Cited in specification).

(Continued)

*Primary Examiner* — Milton I Cano
*Assistant Examiner* — Ling R Zeng
(74) *Attorney, Agent, or Firm* — Westerman, Hattori, Daniels & Adrian, LLP (57) ABSTRACT

Provided is a flexible carbon fiber nonwoven fabric which has resistance to bending, is flexible, and exhibits excellent processability.

9 Claims, 4 Drawing Sheets

(51) Int. Cl.
*D04H 1/728* (2012.01)
*H01M 8/02* (2006.01)
*B01J 20/20* (2006.01)
*B01J 20/28* (2006.01)
*D01F 6/54* (2006.01)
*D01F 6/94* (2006.01)
*D01F 9/22* (2006.01)
*D01F 9/24* (2006.01)

(56) References Cited

U.S. PATENT DOCUMENTS

| | | | |
|---|---|---|---|
| 2007/0122687 A1 | 5/2007 | Sakurai et al. | |
| 2008/0176129 A1* | 7/2008 | Lee et al. | 429/40 |
| 2010/0323272 A1* | 12/2010 | Ozaki et al. | 429/484 |
| 2012/0046434 A1* | 2/2012 | Lee et al. | 526/341 |
| 2012/0171461 A1* | 7/2012 | Uchiyama et al. | 428/304.4 |
| 2012/0214375 A1* | 8/2012 | Kitano et al. | 442/336 |

FOREIGN PATENT DOCUMENTS

| | | |
|---|---|---|
| JP | 2005-240224 A | 9/2005 |
| JP | 2007-27319 A | 2/2007 |
| JP | 2007-70738 A | 3/2007 |
| WO | 2005/045115 A1 | 5/2005 |
| WO | 2007/007491 A1 | 1/2007 |
| WO | 2007/052650 A1 | 5/2007 |
| WO | 2009/069505 A1 | 6/2009 |
| WO | 2009/098812 A1 | 8/2009 |

OTHER PUBLICATIONS

International Search Report of PCT/JP2010/070334, mailing date of Jan. 18, 2011.

* cited by examiner

FLEXIBLE CARBON FIBER NONWOVEN FABRIC

TECHNICAL FIELD

The present invention relates to a flexible carbon fiber nonwoven fabric.

BACKGROUND ART

Nonwoven fabrics composed of ultrafine carbon fibers have hitherto been widely used as impurity-removing filters and as fuel cell electrode components, including gas diffusion layers for fuel cells and electrode catalysts (see, for example, Patent Documents 1 to 7).

However, owing to the fact that the carbon fibers, which have an inherently low resistance to bending, have been made even finer in such nonwoven fabrics, the fabric is very brittle and lacks sufficient strength for processing. Accordingly, a drawback of nonwoven fabrics made of ultrafine carbon fibers is that they cannot be used alone to form such components.

To compensate for such a drawback and enable use in a variety of applications, it has been necessary to reinforce the fabric in some way, such as by increasing the thickness of the nonwoven fabric itself, forming a composite with larger-diameter carbon fibers that already exist, or bonding together the fibers with a binder.

However, applying such reinforcing treatment not only increases the thickness, it also gives rise to other problems which hinder use of the fabric, such as a loss of breathability.

Also, heating to at least 800° C. is generally required to carbonize organic compound, but most organic compound which serves as the carbon precursor has a glass transition point or melting point at or below 800° C. Therefore, when an ultrafine-fiber nonwoven fabric is heated, the organic fibers making up the fabric fuse or deform before the firing temperature is reached, making it impossible to maintain the shape of the fibers.

Hence, in the case of phenolic resins, melting during firing is prevented using a crosslinking agent such as formaldehyde to chemically effect three-dimensional crosslinking beforehand.

With resins such as polyacrylamide, infusibilizing treatment is generally carried out wherein the fibers are gradually heated in air (in the presence of oxygen) so as to oxidize the fiber surfaces and thereby form on the fiber surfaces an organization coat which does not melt. As a result, the fiber shape remains unchanged up to the firing temperature.

Firing and carbonizing ultrafine fibers in this way without associated shape deformation due to melting requires the formation of a three-dimensionally crosslinked structure (thermosetting or hardening) or infusibilization. Polymers that allow this to be done are limited to fibers capable of being infusibilized such as polyacrylonitrile and cellulose fibers, and thermosetting fibers such as amide and amide-imide fibers.

Moreover, infusibilizing ultrafine fibers without associated shape deformation has required strict temperature control.

High-strength ultrafine carbon fibers (carbon nanotubes, or "CNT") are also known.

Yet, although CNTs are both ultrafine and high-strength, because the fibers are of short length, they cannot by themselves be rendered into a nonwoven fabric, and must be consolidated with a binder.

Another drawback is that CNT production requires complex operations.

A flexible carbon nanofiber has been reported in Non-Patent Document 1 (Non-Patent Document 1). This is obtained by dissolving, in methanol as the solvent: a phenolic resin, high-molecular-weight polyvinyl butyral, and also, as electrolytes, pyridine and sodium carbonate ($Na_2CO_3$). The resulting solution is electrospun into a nanofiber nonwoven fabric, which is then subjected to crosslinking treatment with formaldehyde in a hydrochloric acid solution, neutralized and washed, then fired.

However, this production process is highly involved. Moreover, although the resulting carbon nanofibers do exhibit a certain degree of flexibility, they break when bent in two, and thus leave something to be desired in terms of flexibility.

PRIOR-ART DOCUMENTS

Patent Documents

Patent Document 1: JP-A 2003-239164
Patent Document 2: JP-A 2005-240224
Patent Document 3: WO 2005/045115
Patent Document 4: JP-A 2007-70738
Patent Document 5: JP-A 2007-27319
Patent Document 6: WO 2007/052650
Patent Document 7: WO 2009/098812

Non-Patent Document

Non-Patent Document 1: Polymer Journal, Vol. 41, No. 12, p. 1124 (2009)

SUMMARY OF THE INVENTION

Problems to be Solvent by the Invention

It is therefore an object of the present invention to provide a flexible carbon fiber nonwoven fabric which has a good resistance to folding, is supple and has a good processability. A further object is to provide a simple method of producing the same.

Means for Solving the Problems

The inventor has conducted extensive investigations in order to achieve the above objects and has discovered as a result that when a nonwoven fabric which has been obtained by electrospinning a composition prepared by the mixture of at least two organic components, one of which is an electrospinnable polymeric substance and another of which is a different organic compound, with a transition metal is then carbonized, there can be obtained a flexible carbon fiber nonwoven fabric which has such a good resistance to folding that it does not break even when folded in two.

Accordingly, the invention provides:

1. A flexible carbon fiber nonwoven fabric obtained by carbonizing a nonwoven fabric obtained by electrospinning a composition containing an electrospinnable polymeric substance, an organic compound differing from the polymeric substance, and a transition metal;
2. The flexible carbon fiber nonwoven fabric of 1, wherein one or both of the polymeric substance and the organic compound contains a nitrogen atom;
3. The flexible carbon fiber nonwoven fabric of 1 or 2, wherein the polymeric substance is one, two or more selected from among polyacrylonitrile resins, polyester resins, polyurethane resins, polyethylene resins, polypropylene resins, polyacrylic resins, polyether resins, polyvinylidene chloride resins, polyvinyl resins, polyamide resins, polyimide resins and polyamide-imide resins;
4. The flexible carbon fiber nonwoven fabric of any one of 1 to 3, wherein the organic compound is one, two or more selected from among phenolic resins, epoxy resins, melamine resins, urea resins, polycarbodiimide, pitch, cellulose, cellulose derivatives and lignin;
5. The flexible carbon fiber nonwoven fabric of 4, wherein the polymeric substance is a polyacrylonitrile resin and the organic compound is a phenolic resin;
6. The flexible carbon fiber nonwoven fabric of any one of 1 to 5, wherein the transition metal is one, two or more selected from among titanium, cobalt, iron, nickel, copper, zirconia and platinum;
7. The flexible carbon fiber nonwoven fabric of 6, wherein the transition metal is one, two or more selected from among titanium, iron and cobalt;
8. The flexible carbon fiber nonwoven fabric of any one of 1 to 7, wherein the composition includes from 1.5 to 15 parts by weight of the polymeric substance, from 1.5 to 15 parts by weight of the organic compound, and from 0.1 to 2 parts by weight of the transition metal;
9. The flexible carbon fiber nonwoven fabric of any one of 1 to 8 which has a ratio Id/Ig of the peak intensity Id near 1,355 $cm^{-1}$ to the peak intensity Ig near 1,580 $cm^{-1}$, as measured by Raman spectroscopy, in a range of 0.7 to 1.3;
10. A hydrogen storage material composed of the flexible carbon fiber nonwoven fabric of any one of 1 to 9;
11. A gas diffusion layer for a fuel cell, composed of the flexible carbon fiber nonwoven fabric of any one of 1 to 9; and
12. A method of manufacturing a flexible carbon fiber nonwoven fabric, which method includes the steps of: electrospinning a composition containing an electrospinnable polymeric substance, an organic compound differing from the polymeric substance and a transition metal so as to obtain a nonwoven fabric; and carbonizing the nonwoven fabric.

Advantageous Effects of the Invention

The present invention, by making it possible to impart to ultrafine carbon fibers the property of having a good resistance to bending, which has not been achievable by conventional methods, enables a flexible carbon fiber nonwoven fabric that is supple and endowed with a good processability to be provided.

The flexible carbon fiber nonwoven fabric of the invention does not require the type of conventional reinforcement treatment described above, and thus can be directly used in the form of a thin nonwoven fabric in a variety of applications.

Also, because treatment using reagents such as acids, alkalis, hardening agents and crosslinking agents is not required during production of the nonwoven fabric, the production operations can be simplified.

Such a flexible carbon fiber nonwoven fabric can be advantageously used alone as a fuel cell electrode component such as a gas diffusion layer, as other electrode materials, as a support for a catalyst or for hydrogen storage particles, and also as chemical-resistant and heat-resistant filters, heat conductors, heat sinks, thermal insulation fillers, adsorbents and acoustic materials.

In addition, because the carbon fibers making up the flexible carbon fiber nonwoven fabric of the invention have numerous micropores on the surface, this nonwoven fabric can also be used as a hydrogen storage material.

The highly flexible carbon fiber nonwoven fabric of the invention is particularly advantageous when packed into high-pressure vessels for storing hydrogen. For example, when the inventive nonwoven fabric is wound into a roll, in spite of the high density of the rolled fabric, the gaps between the fibers readily form flow channels suitable for moving hydrogen in and out.

BRIEF DESCRIPTION OF THE DIAGRAMS

BEST MODE FOR CARRYING OUT THE INVENTION

The invention is described more fully below.

The flexible carbon fiber nonwoven fabric according to the present invention is obtained by carbonizing a nonwoven fabric obtained by electrospinning a composition which includes an electrospinnable polymeric substance, an organic compound differing from the polymeric substance, and a transition metal.

In the invention, the electrospinnable polymer substance is not subject to any particular limitation and may be suitably selected from among hitherto known electrospinnable polymeric substances.

Illustrative examples include polyacrylonitrile resins, polyester resins, polyurethane resins, polyethylene resins, polypropylene resins, polyacrylic resins, polyether resins, polyvinylidene chloride resins, polyvinyl resins, polyamide resins, polyimide resins and polyamide-imide resins. These may be used singly, or two or more may be used in combination.

Of these, to further increase the folding strength of the resulting carbon fiber nonwoven fabric, a polymeric substance containing a nitrogen atom on the molecule is preferred, and a polyacrylonitrile resin is especially preferred.

In this invention, to have the resulting carbon fiber nonwoven fabric manifest a flexibility and toughness that keeps it from failing even when folded, it is critical for the above-described electrospinnable polymeric substance and an organic compound commonly used as a carbon precursor to be used together. By using these two ingredients together, even in cases where a carbon fiber precursor organic compound that is difficult to electrospin by itself is employed, the electrospinnable polymer plays the role of a "connector," allowing the overall composition to be electrospun and also preventing the development of graphene sheets in the carbon fibers making up the resulting ultrafine carbon fiber nonwoven fabric. Hence, carbon fibers having a good resistance to folding can be obtained.

The organic compound is a substance which differs from the above-described polymeric substance. Any of the various compounds which have hitherto been employed as carbon precursor materials may be used.

Illustrative examples include phenolic resins, epoxy resins, melamine resins, urea resins, polycarbodiimide, pitch, cellulose, cellulose derivatives and lignin. These may be used singly or two or more may be used in combination.

In cases where the polymeric substance used is one which does not contain a nitrogen atom, for the same reasons as indicated above, it is preferable for that the organic compound to be one which contains a nitrogen atom.

A transition metal is essential for achieving the desired flexibility and toughness in the carbon fiber nonwoven fabric of the invention.

That is, by making use of a transition metal-containing composition, when heat is applied to a nonwoven fabric electrospun from the composition, melting can be prevented from occurring up until the firing temperature is reached, and the carbon fiber nonwoven fabric following carbonization can be conferred with a flexibility and toughness that keep the fabric from failing even when folded.

Such transition metals are not subject to any particular limitation, and are exemplified by titanium, cobalt, iron, nickel, copper, zirconia and platinum. Of these, titanium, iron and cobalt are preferred. These may be used singly, or two or more may be used in combination.

These transition metals are preferably used in the form of a complex, salt, hydroxide, sulfate or organic oxide. For example, preferred use may be made of tetraalkoxytitaniums such as tetra-n-butoxytitanium; titanium halides such as titanium(III) chloride and titanium(IV) chloride; organic acid salts such as the ammonium salt of titanium lactate; cobalt halides such as cobalt(II) chloride, cobalt(III) chloride, cobalt(II) bromide, cobalt(II) fluoride, cobalt(III) fluoride, cobalt(II) iodide and cobalt(II) iodate; organic acid salts of cobalt such as cobalt(II) acetate and cobalt(II) octanoate; cobalt(II) hydroxide, cobalt(II) nitrate and cobalt(III) nitrate; iron halides such as iron(II) chloride, iron(III) chloride, iron bromide, iron(II) iodide and iron(II) iodate; organic acid salts of iron such as iron(II) acetate, iron(III) acetate and iron(II) octanoate; iron(II) hydroxide, iron(III) hydroxide, iron(II) nitrate, iron(III) nitrate, iron(II) sulfate and iron(III) sulfate; nickel(II) chloride, nickel(II) hydroxide, nickel(II) sulfate, nickel carbonyl, nickel sulfamate and lithium nickel oxide; copper chloride, copper acetate, copper nitrate, copper hydroxide, copper carbonate, copper fluoride, copper iodate and copper sulfate; zirconium oxychloride, zirconium sulfate, zirconium nitrate, zirconium acetate, ammonium zirconium carbonate, zirconium octanoate, zirconium tetra-n-propoxide, zirconium tetraacetylacetonate; and platinum(II) chloride, platinum(IV) chloride, platinum(IV) bromide and hexachloroplatinic acid salts.

The contents of the above polymeric substance, organic compound and transition metal in the composition used to produce the carbon fiber nonwoven fabric of the invention are not subject to any particular limitation, provided the composition is capable of being electrospun, although it is preferable for the polymeric substance to be included in an amount of from 1.0 to 15 parts by weight, especially from 1.5 to 15 parts by weight, for the organic compound to be included in an amount of from 1.0 to 15 parts by weight, especially from 1.5 to 15 parts by weight, and for the transition metal to be included in an amount (weight of metal) of from 0.1 to 2 parts by weight, especially from 0.1 to 1.5 parts by weight.

Any suitable method may be used to prepare the composition, so long as each of the above ingredients is mixed in accordance with common practice. The respective ingredients may be mixed in any suitable order.

In the practice of the invention, because electrospinning is used to obtain the ultrafine fiber nonwoven fabric, it is essential to employ a solvent for preparing an electrospinning dope.

A solvent which is capable of dissolving the resin to be used may be suitably selected and employed as this solvent. Illustrative examples of solvents which may be used include water, acetone, methanol, ethanol, propanol, isopropanol, toluene, benzene, cyclohexane, cyclohexanone, tetrahydrofuran, dimethylsulfoxide, 1,4-dioxane, carbon tetrachloride, methylene chloride, chloroform, pyridine, trichloroethane, N,N-dimethylformamide, N,N-dimethylacetamide, N-methyl-2-pyrrolidone, ethylene carbonate, diethyl carbonate, propylene carbonate and acetonitrile, as well as organic acids such as formic acid, lactic acid and acetic acid. These solvents may be used singly, or two or more may be mixed and used together.

This solvent may be included in any order. That is, it may be mixed together with the various above ingredients or it may be added after the above composition has been prepared.

Electrospinning is a process in which, as an electrically charged electrospinning dope (electrospinning solution) is spun within an electrical field, the dope is explosion up by forces of repulsion between the electrical charges, resulting in the formation of a very fine fibrous material composed of the resin.

Specifically, with a nozzle for ejecting the dope serving as a first electrode and a collector serving as a second electrode, a high voltage of from several thousands to several tens of thousands of volts is applied to the dope, causing the dope to be discharged as a jet from the nozzle. Due to the high-speed jet and subsequent folding and expansion of the jet within the electrical field, the discharged dope forms into very fine fibers which collect on the collector surface as an ultrafine fiber nonwoven fabric.

The resulting ultrafine fiber nonwoven fabric is then fired to give an ultrafine carbon fiber nonwoven fabric.

At this time, if the ultrafine fiber nonwoven fabric has been obtained using a polymer that is conducive to infusibilizing treatment, the fiber surface may be oxidized and subjected to thermosetting and infusibilizing treatment as in the prior art.

In such a case, the heating temperature is not subject to any particular limitation, so long as infusibilization is possible. Generally, the method used may be one in which the temperature is raised from room temperature to about 300° C. over a period of about 2 to about 10 hours, after which the same temperature is maintained for a period of from about 30 minutes to about 3 hours.

However, even without carrying out conventional infusibilizing treatment, the ultrafine fiber nonwoven fabric obtained as described above may be rendered into an ultrafine carbon fiber nonwoven fabric without melting and uniting of the fibers by gradual heating to the firing temperature of about 800 to about 1,500° C.

The temperature rise rate may be set as suitable, such as from about 1° C./min to 10° C./min. Temperature control need not be very strict.

The resulting ultrafine carbon fiber nonwoven fabric of the invention is a flexible carbon fiber nonwoven fabric which has a resistance to folding sufficient to not break even when folded in two.

Moreover, this flexibility is retained even after the metal atoms have been removed from the resulting carbon fiber nonwoven fabric. It appears from this that the transition metal has the effect of building, in the course of carbonization, a structure having a good resistance to folding. Removal of the metal atoms may be carried out by, for example, acid treatment. Such acid treatment may be carried out by exposing the carbon fiber nonwoven fabric to a single inorganic acid such as hydrochloric acid, nitric acid or sulfuric acid, or to a mixed acid composed of a mixture of such inorganic acids.

Accordingly, in cases where the carbon fiber nonwoven fabric of the invention are to be used in applications which are adversely affected by the presence of metal components, the metal components should be removed by acid treatment.

The carbon fibers making up the ultrafine carbon fiber nonwoven fabric of the invention have a fiber diameter of preferably from 0.1 to 15 µm, more preferably from 0.1 to 10 µm, and even more preferably from 0.1 to 1 µm. The carbon fibers have a pore size, as measured by the bubble point method, of preferably 5 µm or less, and a pore size at the surface of preferably from 0.4 to 50 nm. The fibers have at the surface a micropore (2 nm and smaller) surface area of preferably from 27 to 2,700 $m^2/g$, and have a BET specific surface area of preferably from 30 to 3,000 $m^2/g$.

The carbon fiber nonwoven fabric has a basis weight of preferably from 0.3 to 100 $g/m^2$, a thickness of preferably from 5 to 500 µm, and a bulk density of preferably from 0.06 to 0.3 $g/cm^2$.

The bending stiffness of the nonwoven fabric, as measured by Method B (slide method) described in JIS L 1096, is preferably from 0.0005 to 50 mN·cm. The gas permeability of the nonwoven fabric, as measured by Method A (Frazier method) described in JIS L 1096, is preferably from 0.5 to 300 $mL/sec/cm^2$.

In the carbon fiber nonwoven fabric of the invention, the ratio Id/Ig of the peak intensity Id near 1,355 $cm^{-1}$ to the peak intensity Ig near 1,580 $cm^{-1}$, which indicates the degree of graphitization as measured by Raman spectroscopy, is preferably in a range of from 0.7 to 1.3.

Within this range, the crystalline structure of graphite is disordered and approaches the state of noncrystalline amorphous carbon, meaning that the carbon fiber nonwoven fabric has an even better flexibility.

EXAMPLES

Examples of the invention and Comparative Examples are given below by way of illustration, and not by way of limitation. The fiber diameter and thickness of the nonwoven fabric were measured by the following methods.

(1) Fiber Diameter

The sizes of 50 randomly selected fibers examined under an electron microscope (JSM-67010F, manufactured by JEOL, Ltd.) were measured, and the average fiber diameter was determined.

(2) Thickness of Nonwoven Fabric

Using a digital thickness gauge (SMD-565, manufactured by Teclock Corporation), the thickness was measured at ten random points, and the average thickness of the fabric was determined.

Example 1

(1) Preparation of Electrospinning Dope

An electrospinning dope was prepared by mixing together and dissolving 2.7 wt % of polyacrylonitrile (abbreviated below as "PAN," available as "Barex" from Mitsubishi Chemical Corporation), 3.0 wt % of phenolic resin (abbreviated below as "Ph," available as "PSK-2320" from Gunei Chemical Industry Co., Ltd.) and 3.5 wt % of titanium(IV) butoxide (available from Aldrich Co.) in 90.8 wt % of dimethylformamide (available from Wako Pure Chemical Industries, Ltd.; guaranteed reagent).

(2) Electrospinning

The electrospinning dope obtained as described above was set in an electrospinning system (ESP-2300, manufactured by Fuence Co., Ltd.) and electrospun at a needle outlet diameter of 0.5 mm, an applied voltage of 17 kV, an extrusion pressure of 7 kPa and a relative humidity of 50% (25° C.), thereby forming an ultrafine fiber nonwoven fabric built up of filaments having a diameter of about 600 nm.

(3) Thermosetting (Infusibilizing) Treatment

Figure 1:
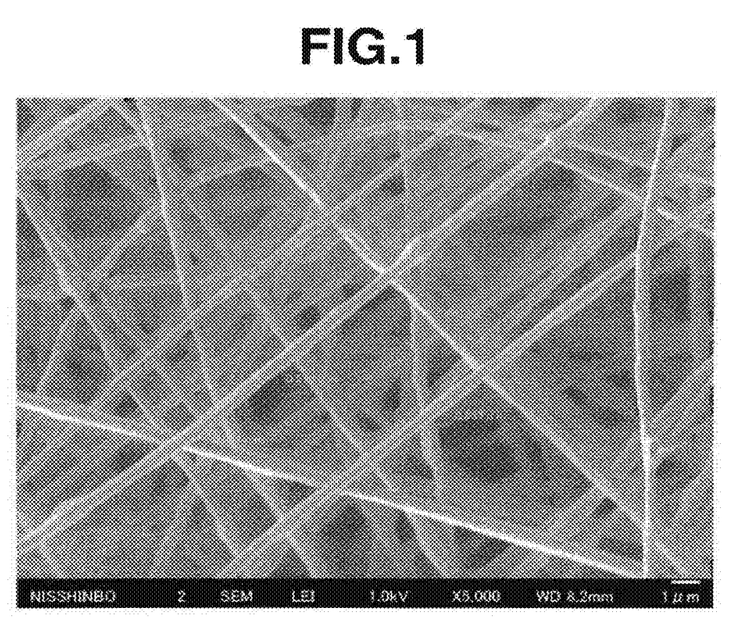
FIG. 1 is an electron micrograph of a nonwoven fabric before carbonization in Example 1.

Thermosetting treatment was carried out by placing the resulting ultrafine fiber nonwoven fabric in an oven, ramping the oven from room temperature to 250° C. over a period of 1.5 hours, and then additionally holding the oven at 250° C. for 1 hour. After thermosetting treatment, the nonwoven fabric was examined under an electron microscope. FIG. 1 shows an electron micrograph of the fabric. As a result, it was confirmed that there was no change in the fiber shape and that the fibers had not melted together and united.

(4) Firing (Carbonizing Treatment)

After thermosetting treatment, the ultrafine fiber nonwoven fabric was subjected to carbonizing treatment under the following conditions, giving an ultrafine carbon fiber nonwoven fabric.

Figure 2:
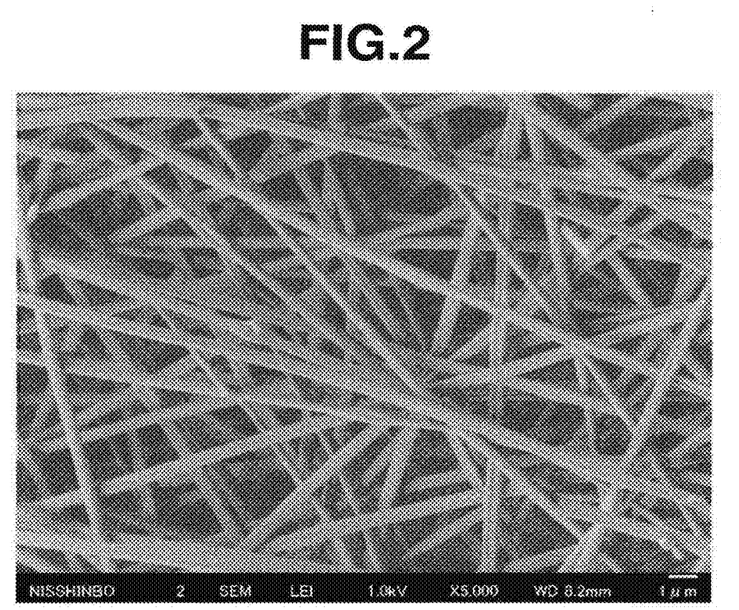
FIG. 2 is an electron micrograph of the carbon fiber nonwoven fabric obtained in Example 1.

Temperature ramp-up rate: 10° C./min
Holding temperature: 900° C.
Holding time: 60 min
Nitrogen flow rate: 5 L/min The resulting ultrafine carbon fiber nonwoven fabric was examined under an electron microscope. FIG. 2 shows an electron micrograph of the fabric. As a result, it was confirmed that the fibers had not melted together and united. The fiber diameter was about 500 nm. The nonwoven fabric had a thickness of 20 µm.

Figure 3:
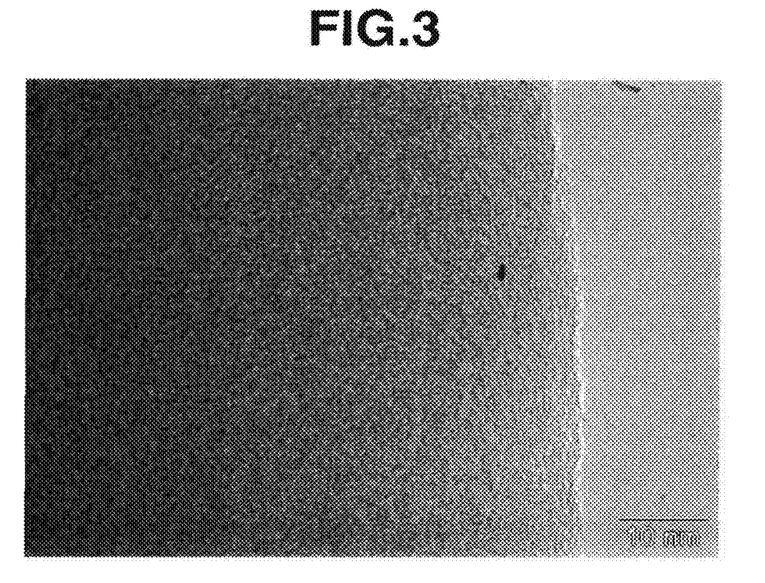
FIG. 3 is a transmission electron micrograph of the fibers making up the carbon fiber nonwoven fabric obtained in Example 1.

The structure of the carbon fibers making up the resulting ultrafine carbon fiber nonwoven fabric was examined using a transmission electron microscope (TEM) (JEM-2010, manufactured by JEOL, Ltd.). FIG. 3 shows a TEM image of the fabric. As a result, the conspicuous development of graphene sheet structures was not observed in the carbonized fibers.

Example 2

(1) Synthesis of Polyacrylonitrile-Polymethacrylic Acid Copolymer

A flask was charged with 30.93 g of acrylonitrile (available from Wako Pure Chemical Industries, Ltd.), 4.07 g of methacrylic acid (Wako Pure Chemical Industries) and 300 mL of pure water, following which deaeration (oxygen removal) was carried out by bubbling through nitrogen gas. The flask contents were then heated to 70° C., following which a solution of 100 mg of potassium peroxodisulfate (Wako Pure Chemical Industries) dissolved in 50 mL of pure water was poured in under stirring. Stirring was continued for 4 hours, after which the cloudy solution was concentrated and finally dried in vacuo, giving about 20 g of a polyacrylonitrile-polymethacrylic acid copolymer (referred to below as "PAN-MAA").

(2) Preparation of Electrospinning Dope

An electrospinning dope was prepared by mixing together and dissolving 1.5 wt % of the PAN-MAA obtained as described above, 1.5 wt % of Ph and 0.4 wt % of titanium(IV)

tetrachloride (Aldrich Co.) in 96.6 wt % of dimethylformamide (Wako Pure Chemical Industries; guaranteed reagent).

(3) Electrospinning

Electrospinning was carried out under the same conditions as in Example 1, forming an ultrafine fiber nonwoven fabric built up of filaments having a diameter of about 200 nm.

(4) Consecutive Thermosetting and Firing (Carbonizing) Treatment

The thermosetting treatment carried out in Example 1 was omitted. Instead, the ultrafine fiber nonwoven fabric obtained after electrospinning was heat-treated under the following conditions, giving an ultrafine carbon fiber nonwoven fabric.

Temperature ramp-up rate: 10° C./min
Holding temperature: 900° C.
Holding time: 60 min
Nitrogen flow rate: 5 L/min The resulting ultrafine carbon fiber nonwoven fabric was examined under an electron microscope, from which it was confirmed that the fibers had not melted together and united. The fiber diameter was about 100 nm. The nonwoven fabric had a thickness of 20 μm.

Example 3

(1) Preparation of Electrospinning Dope

An electrospinning dope was prepared by mixing together and dissolving 15 wt % of PAN, 15 wt % of Ph and 4.0 wt % of titanium(IV) tetrachloride (Aldrich Co.) in 66 wt % of dimethylformamide (Wako Pure Chemical Industries; guaranteed reagent).

(2) Electrospinning

Electrospinning was carried out under the same conditions as in Example 1, forming an ultrafine fiber nonwoven fabric built up of filaments having a diameter of about 15 μm.

(3) Consecutive Thermosetting and Firing (Carbonizing) Treatment

Heat treatment was carried out under the same conditions as in Example 2, giving an ultrafine carbon fiber nonwoven fabric.

The resulting ultrafine carbon fiber nonwoven fabric was examined under an electron microscope, from which it was confirmed that the fibers had not melted together and united. The fiber diameter was about 10 μm. The nonwoven fabric had a thickness of 20 μm.

Example 4

(1) Preparation of Electrospinning Dope

An electrospinning dope was prepared by mixing together and dissolving 1.5 wt % of PAN, 1.5 wt % of Ph and 0.4 wt % of cobalt(II) chloride (Aldrich Co.) in 96.6 wt % of dimethylformamide (Wako Pure Chemical Industries; guaranteed reagent).

(2) Electrospinning

Electrospinning was carried out under the same conditions as in Example 1, forming an ultrafine fiber nonwoven fabric built up of filaments having a diameter of about 500 nm.

(3) Consecutive Thermosetting and Firing (Carbonizing) Treatment

Heat treatment was carried out under the same conditions as in Example 2, giving an ultrafine carbon fiber nonwoven fabric.

The resulting ultrafine carbon fiber nonwoven fabric was examined under an electron microscope, from which it was confirmed that the fibers had not melted together and united. The fiber diameter was about 400 nm. The nonwoven fabric had a thickness of 20 μm.

Example 5

(1) Preparation of Electrospinning Dope

An electrospinning dope was prepared by mixing together and dissolving 1.5 wt % of PAN, 1.5 wt % of Ph and 0.5 wt % of iron(III) chloride (Aldrich Co.) in 96.5 wt % of dimethylformamide (Wako Pure Chemical Industries; guaranteed reagent).

(2) Electrospinning

Electrospinning was carried out under the same conditions as in Example 1, forming an ultrafine fiber nonwoven fabric built up of filaments having a diameter of about 500 nm.

(3) Consecutive Thermosetting and Firing (Carbonizing) Treatment

Heat treatment was carried out under the same conditions as in Example 2, giving an ultrafine carbon fiber nonwoven fabric.

The resulting ultrafine carbon fiber nonwoven fabric was examined under an electron microscope, from which it was confirmed that the fibers had not melted together and united. The fiber diameter was about 400 nm. The nonwoven fabric had a thickness of 20 μm.

Comparative Example 1

(1) Preparation of Electrospinning Dope

An electrospinning dope was prepared by mixing together and dissolving 1.5 wt % of PAN and 1.5 wt % of Ph in 97.0 wt % of dimethylformamide (Wako Pure Chemical Industries; guaranteed reagent).

(2) Electrospinning

Electrospinning was carried out under the same conditions as in Example 1, forming an ultrafine fiber nonwoven fabric built up of filaments having a diameter of about 500 nm.

(3) Thermosetting Treatment

Thermosetting treatment was carried out under the same conditions as in Example 1, but melting of the fibers was observed near 150° C., following which the fibers melted completely, as a result of which the nonwoven fabric shape could not be retained.

Accordingly, the ultrafine fiber nonwoven fabric which was obtained as described above was immersed for 2 hours at 98° C. in an aqueous solution (hardening solution) containing 15 wt % of hydrogen chloride and 8 wt % of formaldehyde, following which the fabric was neutralized, rinsed with water and dried, then subjected to hardening treatment.

(4) Firing (Carbonizing Treatment)

Carbonizing treatment was carried out under the same conditions as in Example 1. Following treatment, the ultrafine carbon fiber nonwoven fabric was examined under an electron microscope, from which it was confirmed that the fibers had not melted together and united. The fiber diameter was about 400 nm. The nonwoven fabric had a thickness of 20 μm.

Comparative Example 2

(Non-Patent Document 1, pp. 1124-1128, Table 1, "P12")

(1) Preparation of Electrospinning Dope

An electrospinning dope was prepared by mixing together and dissolving 29.4 wt % of Ph and 0.6 wt % of polyvinyl butyral (Wako Pure Chemical Industries; average degree of polymerization, about 2,300 to 2,500; abbreviated below as "PVB") in 70.0 wt % of methanol (Wako Pure Chemical Industries; guaranteed reagent).

(2) Electrospinning

Other than setting the applied voltage to 15 kV and the relative humidity to 35% (at 25° C.), electrospinning was carried out under the same conditions as in Example 1, forming an ultrafine fiber nonwoven fabric built up of filaments having a diameter of about 1,380 nm.

(3) Hardening Treatment

The ultrafine fiber nonwoven fabric obtained as described above was immersed at 98° C. for 2 hours in an aqueous solution (hardening solution) containing 15 wt % of hydrogen chloride and 8 wt % of formaldehyde. The fabric was then taken out and rinsed with water, neutralized with 3% ammonia water at 60° C. for 30 minutes, rinsed with water again, and dried, giving a Ph-PVB ultrafine fiber nonwoven fabric.

When thermosetting treatment was carried out under the same conditions as in Example 1, melting of the fibers was observed near 150° C., following which the fibers melted completely, as a result of which the nonwoven fabric shape could not be retained.

(4) Firing (Carbonizing Treatment)

Carbonizing treatment was carried out under the same conditions as in Example 1. Following treatment, the ultrafine carbon fiber nonwoven fabric was examined under an electron microscope, from which it was confirmed that the fibers had not melted together and united. The fiber diameter was about 1,230 nm. The nonwoven fabric had a thickness of 20 μm.

Comparative Example 3

(Non-Patent Document 1, pp. 1124-1128, Table 1, "P25")

(1) Preparation of Electrospinning Dope

An electrospinning dope was prepared by mixing together and dissolving 7.9 wt % of Ph, 2.0 wt % of PVB, 54.0 wt % of methanol (Wako Pure Chemical Industries; guaranteed reagent), 36.0 wt % of pyridine (Wako Pure Chemical Industries; guaranteed reagent) and 0.1 wt % of sodium carbonate (Wako Pure Chemical Industries; guaranteed reagent).

(2) Electrospinning

Other than setting the applied voltage to 15 kV and the relative humidity to 35% (at 25° C.), electrospinning was carried out under the same conditions as in Example 1, forming an ultrafine fiber nonwoven fabric built up of filaments having a diameter of about 140 nm.

(3) Hardening Treatment

The ultrafine fiber nonwoven fabric obtained as described above was immersed at 98° C. for 2 hours in an aqueous solution (hardening solution) containing 15 wt % of hydrogen chloride and 8 wt % of formaldehyde. The fabric was then taken out and rinsed with water, neutralized with 3% ammonia water at 60° C. for 30 minutes, rinsed with water again, and dried, giving a Ph-PVB ultrafine fiber nonwoven fabric.

When thermosetting treatment was carried out under the same conditions as in Example 1, melting of the fibers was observed near 150° C., following which the fibers melted completely, as a result of which the nonwoven fabric shape could not be retained.

(4) Firing (Carbonizing Treatment)

Carbonizing treatment was carried out under the same conditions as in Example 1. Following treatment, the ultrafine carbon fiber nonwoven fabric was examined under an electron microscope, from which it was confirmed that the fibers had not melted together and united. The fiber diameter was about 110 nm. The nonwoven fabric had a thickness of 20 μm.

Above Examples 1 to 5 and Comparative Examples 1 to 3 are summarized in Table 1.

TABLE 1

| | | Polymeric substance | | Organic compound | | Transition metal | | | Carbon fiber | Nonwoven fabric |
| --- | --- | --- | --- | --- | --- | --- | --- | --- | --- | --- |
| | | | | | | | Amount | Amount | Firing | diameter | thickness |
| | | Type | Amount (pbw) | Type | Amount (pbw) | Type | (pbw, as compound) | (pbw, as metal) | temperature (° C.) | (nm) | (μm) |
| Example | 1 | PAN | 2.70 | Ph | 3.00 | Ti | 3.50 | 0.50 | 900 | 500 | 20 |
| | 2 | PAN-MAA | 1.50 | Ph | 1.50 | Ti | 0.40 | 0.10 | 900 | 100 | 20 |
| | 3 | PAN | 15.00 | Ph | 15.00 | Ti | 4.00 | 1.01 | 900 | 10,000 | 20 |
| | 4 | PAN | 1.50 | Ph | 1.50 | Co | 0.40 | 0.18 | 900 | 400 | 20 |
| | 5 | PAN | 1.50 | Ph | 1.50 | Fe | 0.50 | 0.17 | 900 | 400 | 20 |
| Comparative Example | 1 | PAN | 1.50 | Ph | 1.50 | none | — | — | 900 | 400 | 20 |
| | 2 | PVB | 0.60 | Ph | 29.40 | none | — | — | 900 | 1,230 | 20 |
| | 3 | PVB | 2.00 | Ph | 7.90 | none | — | — | 900 | 110 | 20 |

The ultrafine carbon fiber nonwoven fabrics obtained in Examples 1 to 5 and Comparative Examples 1 to 3 were subjected to a folding test, a folding test after concentrated hydrochloric acid treatment (in Examples 1 to 5), measurement of the specific surface area and Raman analysis by the methods described below. The results are presented in Table 2.

(1) Folding Test

Figure 4:
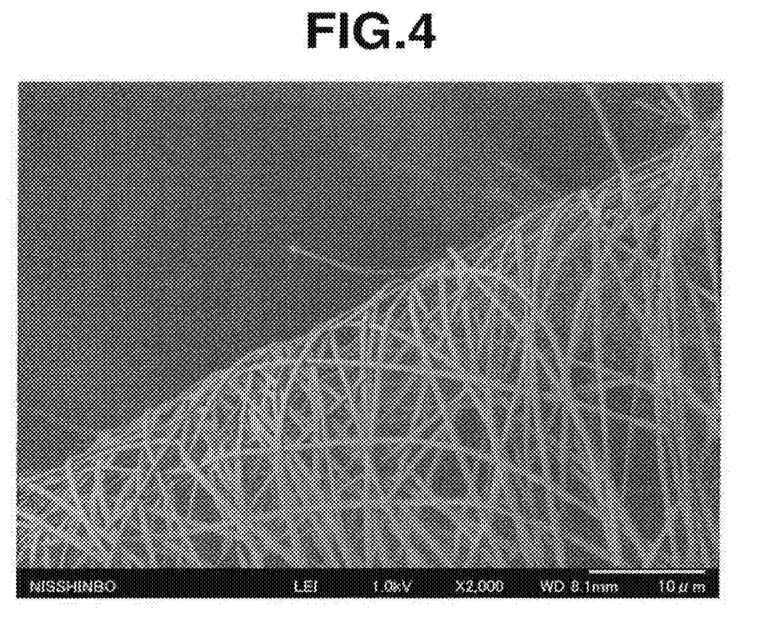
FIG. 4 is an electron micrograph of the folded area following a folding test on the carbon fiber nonwoven fabric obtained in Example 1.
Figure 5:
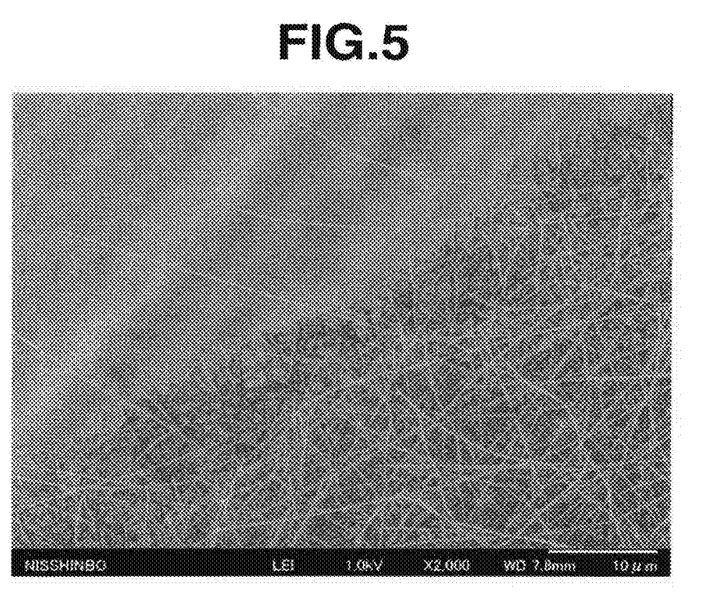
FIG. 5 is an electron micrograph of the folded area following a folding test on the carbon fiber nonwoven fabric obtained in Comparative Example 3.

Each of the ultrafine carbon fiber nonwoven fabrics (size of specimens: 10 cm×10 cm) obtained in Examples 1 to 5 and Comparative Examples 1 to 3 was folded in two, clamped between two stainless steel plates and a load of 98 kPa (1 kgf/cm$^2$) was applied. The nonwoven fabric was then examined to determine whether breaking had occurred. FIG. 4 shows an electron micrograph of the folded area of the ultrafine carbon fiber nonwoven fabric obtained in Example 1, and FIG. 5 shows an electron micrograph of the folded area of the ultrafine carbon fiber nonwoven fabric obtained in Comparative Example 3.

(2) Folding Test Following Concentrated Hydrochloric Acid Treatment

One gram of the ultrafine carbon fiber nonwoven fabrics obtained in Examples 1 to 5 was immersed in 50 mL of concentrated hydrochloric acid, left to stand at room temperature for 18 hours, then washed five times with 200 mL of pure water. The washed nonwoven fabric was dried in vacuo, and the same folding test as described above was carried out.

In order to determine whether the metal had been washed from the ultrafine carbon fiber nonwoven fabric by this treatment, a portion of the washed and dried ultrafine carbon fiber nonwoven fabric was treated in air at 700° C., the resulting ash was immersed in concentrated hydrochloric acid, and the supernatant was measured with a high-frequency plasma emission spectrometer (ICPS-8100, manufactured by Shimadzu Corporation). As a result, all of the nonwoven fabrics were confirmed to be free of metal residues.

(3) Specific Surface Area Measurement

The ultrafine carbon fiber nonwoven fabrics obtained in Examples 1 to 5 and Comparative Examples 1 to 3 were shredded. Using an instrument for measuring the specific surface area (Belsorp Max, available from Bel Japan, Inc.), the specific surface area was determined by using the BET method to measure the adsorption of 77 K nitrogen and the pore size distribution was determined by the MP method. With regard to the pore size distributions in Examples 4 and 5 and Comparative Example 1, because the presence of mesopores was apparent from the adsorption isotherms, mesopores were also determined by additionally using the BJH method.

(4) Raman Spectroscopy

The ultrafine carbon fiber nonwoven fabrics obtained in Examples 1 to 5 and Comparative Examples 1 to 3 were shredded, and measurement was carried out using a microlaser Raman spectroscope (Horiba Jobin Yvon Co., Ltd.; LabRAM HR-800) and using an argon laser (wavelength, 532 nm). The ratio Id/Ig of the peak intensity of the D band near 1,355 $cm^{-1}$ cm (Id) to the peak intensity of the G band near 1,580 $cm^{-1}$ (Ig) was determined from the measurement results.

(3) Consecutive Thermosetting and Firing (Carbonizing) Treatment

The ultrafine fiber nonwoven fabric obtained after electrospinning was heat-treated under the following conditions, giving an ultrafine carbon fiber nonwoven fabric.
Temperature ramp-up rate: 10° C./min
Holding temperature: 1,500° C.
Holding time: 60 min
Nitrogen flow rate: 5 L/min The resulting ultrafine carbon fiber nonwoven fabric was examined under an electron microscope, from which it was confirmed that the fibers had not melted together and united. The fiber diameter was about 200 nm. The nonwoven fabric had a thickness of about 5 μm.

Example 7

Aside from setting the thickness of the nonwoven fabric at the time of electrospinning to 110 μm, an ultrafine carbon fiber nonwoven fabric was produced under the same conditions as in Example 6. Next, thermosetting and firing were carried out under the same conditions as in Example 6, giving an ultrafine carbon fiber nonwoven fabric having a fiber diameter of about 200 nm and a thickness of about 100 μm.

Example 8

Aside from setting the thickness of the nonwoven fabric at the time of electrospinning to 550 μm, an ultrafine carbon

TABLE 2

| | | Folding test | | Specific surface area ($m^2/g$) | Surface pore size distribution (nm) | Micropore (≤2 nm) surface area ($m^2/g$) | Id/Ig |
|---|---|---|---|---|---|---|---|
| | | No acid treatment | With acid treatment | | | | |
| Example | 1 | no breaking | no breaking | 600 | 0.4-2 | 540 | 1.1 |
| | 2 | no breaking | no breaking | 3,000 | 0.4-2 | 2,700 | 1.0 |
| | 3 | no breaking | no breaking | 30 | 0.4-2 | 27 | 1.2 |
| | 4 | no breaking | no breaking | 1,000 | 0.4-20 | 600 | 0.9 |
| | 5 | no breaking | no breaking | 800 | 0.4-50 | 720 | 0.8 |
| Comparative Example | 1 | breaking occurred | — | 1,500 | 0.4-50 | 600 | 1.5 |
| | 2 | breaking occurred | — | 610 | 0.4-100 | 490 | 1 |
| | 3 | breaking occurred | — | 800 | 0.4-100 | 650 | 1 |

Example 6

(1) Preparation of Electrospinning Dope

An electrospinning dope was prepared by mixing together and dissolving 1.5 wt % of PAN-MAA, 1.5 wt % of Ph and 2.7 wt % of titanium(IV) tetrachloride in 94.3 wt % of dimethylformamide (Wako Pure Chemical Industries; guaranteed reagent).

(2) Electrospinning

Electrospinning was carried out under the same conditions as in Example 1, forming an ultrafine fiber nonwoven fabric having a thickness of about 6 μm built up of filaments having a diameter of about 300 nm.

fiber nonwoven fabric was produced under the same conditions as in Example 6. Next, thermosetting and firing were carried out under the same conditions as in Example 6, giving an ultrafine carbon fiber nonwoven fabric having a fiber diameter of about 200 nm and a thickness of about 500 μm.

Example 9

Aside from setting the thickness of the nonwoven fabric at the time of electrospinning to 500 μm, an ultrafine carbon fiber nonwoven fabric was produced under the same conditions as in Example 6. Next, thermosetting and firing were carried out under the same conditions as in Example 6, thereby giving an ultrafine carbon fiber nonwoven fabric having a fiber diameter of about 200 nm and a thickness of about 450 μm. The nonwoven fabric was then pressed, and thereby compressing it to a thickness of 300 μm.

Comparative Example 4

(1) Preparation of Electrospinning Dope

An electrospinning dope was prepared by mixing together and dissolving 3 wt % of PAN and 97.0 wt % of dimethylformamide (Wako Pure Chemical Industries; guaranteed reagent).

(2) Electrospinning

Electrospinning was carried out under the same conditions as in Example 1, forming an ultrafine fiber nonwoven fabric having a thickness of about 120 μm built up of filaments having a diameter of about 300 nm.

(3) Thermosetting Treatment

Thermosetting treatment was carried out under the same conditions as in Example 1. The treated nonwoven fabric was examined under an electron microscope, from which it was confirmed that there was no change in the shape of the fibers and that the fibers had not melted together and united.

(4) Firing (Carbonizing Treatment)

Aside from setting the holding temperature to 1,500° C., carbonizing treatment was carried out under the same conditions as in Example 1. Following treatment, the ultrafine carbon fiber nonwoven fabric was examined under an electron microscope, from which it was confirmed that the fibers had not melted together and united. The fiber diameter was about 200 nm. The nonwoven fabric had a thickness of about 100 μm.

After firing, the nonwoven fabric was very brittle, making it impossible to measure the maximum pore size by the subsequently described bubble point method or to measure the bending stiffness and gas permeability.

Comparative Example 5

(1) Preparation of Electrospinning Dope

An electrospinning dope was prepared by mixing together and dissolving 3 wt % of the PAN-MAA prepared in Example 2 and 2.7 wt % of cobalt(II) chloride (Aldrich Co.) in 94.3 wt % of dimethylformamide (Wako Pure Chemical Industries; guaranteed reagent).

(2) Electrospinning

Electrospinning was carried out under the same conditions as in Example 1, forming an ultrafine fiber nonwoven fabric having a thickness of about 120 μm built up of filaments having a diameter of about 300 nm.

(3) Thermosetting Treatment

Thermosetting treatment was carried out under the same conditions as in Example 1. The treated nonwoven fabric was examined under an electron microscope, from which it was confirmed that there was no change in the shape of the fibers and that the fibers had not melted together and united.

(4) Firing (Carbonizing Treatment)

Aside from setting the holding temperature to 1,500° C., carbonizing treatment was carried out under the same conditions as in Example 1. Following treatment, the ultrafine carbon fiber nonwoven fabric was examined under an electron microscope, from which it was confirmed that the fibers had not melted together and united. The fiber diameter was about 200 nm. The nonwoven fabric had a thickness of about 100 μm.

After firing, the nonwoven fabric was very brittle, making it impossible to measure the maximum pore size by the bubble point method or to measure the bending stiffness and gas permeability.

Figure 6:
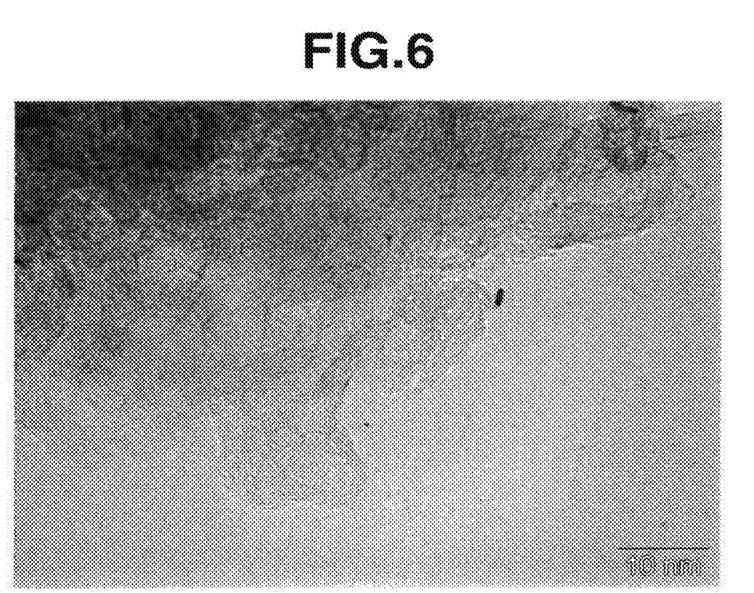
FIG. 6 is a transmission electron micrograph of the fibers making up the carbon fiber nonwoven fabric obtained in Comparative Example 5.

The fibers were examined under a transmission electron microscope (TEM) to determine the cause of the above, whereupon the development of graphene sheets was observed. FIG. 6 shows a TEM image. The development of graphene sheets and the layer structure these form presumably triggered structural changes at the interior of the fibers, making the fibers brittle to folding.

Above Examples 6 to 9 and Comparative Examples 4 and 5 are summarized in Table 3.

TABLE 3

|  |  | Polymeric substance | | Organic compound | | Transition metal | | | Firing temperature (° C.) | Carbon fiber diameter (nm) | Nonwoven fabric thickness (μm) |
| --- | --- | --- | --- | --- | --- | --- | --- | --- | --- | --- | --- |
|  |  | Type | Amount (pbw) | Type | Amount (pbw) | Type | Amount (pbw, as compound) | Amount (pbw, as metal) | | | |
| Example | 6 | PAN-MAA | 1.50 | Ph | 1.50 | Ti | 2.70 | 0.68 | 1,500 | 200 | 5 |
|  | 7 | PAN-MAA | 1.50 | Ph | 1.50 | Ti | 2.70 | 0.68 | 1,500 | 200 | 100 |
|  | 8 | PAN-MAA | 1.50 | Ph | 1.50 | Ti | 2.70 | 0.68 | 1,500 | 200 | 500 |
|  | 9 | PAN-MAA | 1.50 | Ph | 1.50 | Ti | 2.70 | 0.68 | 1,500 | 200 | 300 |
| Comparative Example | 4 | PAN | 3.00 | none | — | none | — | — | 1,500 | 200 | 100 |
|  | 5 | PAN-MAA | 3.00 | none | — | Co | 2.70 | 1.23 | 1,500 | 200 | 100 |

The ultrafine carbon fiber nonwoven fabrics obtained in Examples 6 to 9 and Comparative Examples 4 and 5 were subjected to a folding test and measurement of the basis weight, bubble point maximum pore size, gas permeability, bulk density, bending stiffness and electrical resistivity by the methods described below. The results are presented in Table 4.

(1) Folding Test

The same method as described above was carried out.

(2) Basis Weight

A nonwoven fabric specimen having a size of 20 cm×20 cm was dried, following which the weight was measured.

(3) Bubble Point Maximum Pore Size

The maximum pore size was determined by the bubble point method using a porous material automated pore size distribution measuring system (Automated Perm Porometer, from Porous Materials, Inc.).

(4) Gas Permeability Measurement

Measured in general accordance with Method A (Frazier method) described in JIS L 1096.

(5) Bulk Density

Calculated from the thickness and basis weight.

(6) Bending Stiffness

Measured in general accordance with Method B (slide method) described in JIS L 1096.

(7) Electrical Resistivity

The nonwoven fabric was clamped between gold-plated electrode plates, each having a radius of 3 cm and a thickness of 1 cm, the electrical resistivity under the application of a load of 10 kPa was measured, and the electrical resistivity in the thickness direction per unit area was calculated.

TABLE 4

| | | Folding test | Basis weight (g/m$^2$) | Maximum pore size (μm) | Bulk density (g/cm$^3$) | Bending stiffness (mN·cm) | Gas permeability (mL/sec/cm$^2$) | Electrical resistivity (mΩ·cm$^2$) |
|---|---|---|---|---|---|---|---|---|
| Example | 6 | no breaking | 0.3 | 5 | 0.06 | 0.0005 | 300 | 55 |
| | 7 | no breaking | 10.0 | 4 | 0.10 | 0.2 | 9 | 69 |
| | 8 | no breaking | 100.0 | 4 | 0.20 | 36 | 0.5 | 77 |
| | 9 | no breaking | 90.0 | 3 | 0.30 | 50 | 1 | 70 |
| Comparative Example | 4 | breaking occurred | 100.0 | not measurable | 0.10 | not measurable | not measurable | 91 |
| | 5 | breaking occurred | 100.0 | not measurable | 0.10 | not measurable | not measurable | 73 |

As shown in Tables 2 and 4, it is apparent that the carbon fiber nonwoven fabrics in each of the examples of the invention that were obtained using compositions containing a PAN resin, Ph and a transition metal were flexible and had a good resistance to folding.

By contrast, it is apparent that flexible carbon fiber nonwoven fabrics having a good resistance to folding cannot be obtained from a composition containing PAN and Ph alone (Comparative Example 1), a composition containing PAN alone (Comparative Example 4), or a composition containing a PAN resin and a transition metal alone (Comparative Example 5).

In addition, it is apparent from the electron micrograph in FIG. 5 that flexible carbon fiber nonwoven fabrics having a good resistance to folding cannot be obtained from a system composed of polyvinyl butyral mixed with a phenolic resin (Comparative Example 2), or a system composed of a phenolic resin to which polyvinyl butyral has been added and to which pyridine and sodium carbonate have also been added as electrolytes.

Example 10

Measurement of Hydrogen Adsorption by Ultrafine Carbon Fiber Nonwoven Fabric

Figure 7:
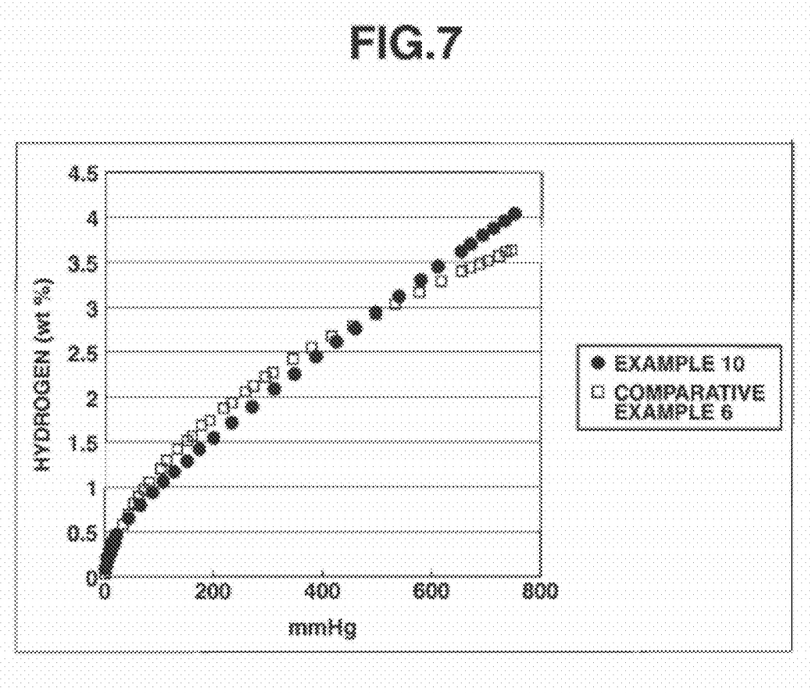
FIG. 7 is a graph showing the relationship between the amount of hydrogen adsorbed per gram and the measurement pressure (mmHg) in Example 10 and Comparative Example 6.

The ultrafine carbon fiber nonwoven fabric produced in Example 1 was shredded, and the hydrogen adsorption isotherm curve at 77 K was measured for 150 mg of the shredded fabric using a specific surface area measuring instrument (Belsorp Max, from Bel Japan, Inc.). The amount of hydrogen adsorbed per gram was determined from the hydrogen adsorption volume obtained by measurement (cm$^3$/g·STP, where STP is 101.325 kPa and 0° C. (273 K)), and the relationship between the amount of adsorbed hydrogen and the measurement pressure (mmHg) was plotted on a graph. The results are shown in FIG. 7.

Comparative Example 6

Measurement of Hydrogen Adsorption by Maxsorb®

Aside from using 150 mg of activated carbon (Maxsorb®, available from Kansai Coke and Chemicals Co., Ltd.), hydrogen adsorption was measured in the same way as in Example 10, and the amount of hydrogen adsorbed per gram was determined. The relationship of this amount with the measurement pressure (mmHg) was plotted on a graph. The results are shown in FIG. 7

As shown in FIG. 7, activated carbon absorbed about 3.6 wt % /g of hydrogen under a pressure of 760 mmHg (atmospheric pressure), whereas the ultrafine carbon fiber nonwoven fabric exhibited a higher value of about 4.0 wt % /g. Hence, ultrafine carbon fiber nonwoven fabric can be regarded as advantageous when considering the storage of hydrogen at high pressure.

The invention claimed is:

1. A flexible carbon fiber nonwoven fabric obtained by carbonizing a nonwoven fabric obtained by electrospinning a composition comprising an electrospinnable polymeric substance, an organic compound, and a transition metal,
    wherein the flexible carbon fiber nonwoven fabric has a ratio Id/Ig of the peak intensity Id near 1,355 cm$^{-1}$ to the peak intensity Ig near 1,580 cm$^{-1}$, as a measured by Raman spectroscopy, in a range of 0.7 to 1.3,
    wherein the electrospinnable polymetric substance is one or more selected from among polyacrylonitrile resins, polyester resins, polyurethane resins, polyethylene resins, polypropylene resins, polyacrylic resins, polyether resins, polyvinylidene chloride resins, polyvinyl resins, polyamide resins, polyimide resins and polyamide-imide resins,
    wherein the organic compound is one or more selected from among phenolic resins, epoxy resins, melamine resins, urea resins, polycarbodiimide, pitch, cellulose, cellulose derivatives and lignin, and
    wherein the nonwoven fabric has a bending stiffness, as measured by Method B slide method described in JIS L 1096, is from 0.0005 to 50 mN·cm.

2. The flexible carbon fiber nonwoven fabric of claim 1, wherein one or both of the polymeric substance and the organic compound contains a nitrogen atom.

3. The flexible carbon fiber nonwoven fabric of claim 1, wherein the polymeric substance is a polyacrylonitrile resin and the organic compound is a phenolic resin.

4. The flexible carbon fiber nonwoven fabric of claim 1, wherein the transition metal is one, two or more selected from among titanium, cobalt, iron, nickel, copper, zirconia and platinum.

5. The flexible carbon fiber nonwoven fabric of claim 4, wherein the transition metal is one, two or more selected from among titanium, iron and cobalt.

6. The flexible carbon fiber nonwoven fabric of claim 1, wherein the composition includes from 1.5 to 15 parts by weight of the polymeric substance, from 1.5 to 15 parts by weight of the organic compound, and from 0.1 to 2 parts by weight of the transition metal.

7. A hydrogen storage material comprising the flexible carbon fiber nonwoven fabric of claim 1.

8. A gas diffusion layer for a fuel cell, comprising the flexible carbon fiber nonwoven fabric of claim 1.

9. A method of manufacturing a flexible carbon fiber nonwoven fabric of claim 1, comprising the steps of: electrospinning a composition containing an electrospinnable polymeric substance, an organic compound differing from the polymeric substance and a transition metal so as to obtain a nonwoven fabric; and carbonizing the nonwoven fabric.

\* \* \* \* \*